United States Patent
Cao et al.

(10) Patent No.: US 11,096,260 B2
(45) Date of Patent: *Aug. 17, 2021

(54) AMBIENT LIGHT SENSING LIGHTING STROBE SYSTEM

(71) Applicant: LOGITECH EUROPE S.A., Lausanne (CH)

(72) Inventors: Wei Cao, Shanghai (CN); Scott Gant, Poway, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/830,095

(22) Filed: Mar. 25, 2020

(65) Prior Publication Data
US 2020/0229284 A1    Jul. 16, 2020

Related U.S. Application Data

(63) Continuation-in-part of application No. 16/359,078, filed on Mar. 20, 2019, now Pat. No. 10,609,781.

(60) Provisional application No. 62/646,375, filed on Mar. 22, 2018.

(51) Int. Cl.
  *H05B 47/11*   (2020.01)
  *H05B 45/22*   (2020.01)
  *H05B 45/12*   (2020.01)

(52) U.S. Cl.
  CPC ............. *H05B 47/11* (2020.01); *H05B 45/12* (2020.01); *H05B 45/22* (2020.01)

(58) Field of Classification Search
  CPC ........ H05B 47/19; H05B 45/00; H05B 45/10; H05B 45/20; H05B 47/10; H05B 47/105; H05B 47/11; H05B 47/175; H05B 45/37; H05B 47/12; H05B 33/08; H05B 45/60; H05B 47/16; H05B 47/18; H05B 45/22; H05B 45/39; H05B 45/50; H05B 47/125; H05B 47/155; H05B 47/165; H05B 47/185; H05B 47/195
See application file for complete search history.

(56) References Cited

U.S. PATENT DOCUMENTS

| | | | |
|---|---|---|---|
| 10,972,685 B2* | 4/2021 | Mehdi | H05B 45/00 |
| 2012/0249013 A1 | 10/2012 | Valois et al. | |
| 2014/0062297 A1* | 3/2014 | Bora | H05B 47/16 315/34 |
| 2016/0255941 A1* | 9/2016 | Yang | A45D 42/10 |
| 2018/0220506 A1 | 8/2018 | Sadwick | |

OTHER PUBLICATIONS

Vlady Radev, NAP 2016: SoftPanels LED Lights with Build-In Color Meter and Skin Tone Enhance Feature, Apr. 16, 2016. https://www.4kshooters.net/2016/04/16/nab-2016-softpanels-led-lights-with-built-in-color-meter-and-skin-tone-enhance-feature/.

(Continued)

*Primary Examiner* — Monica C King
(74) *Attorney, Agent, or Firm* — Patterson & Sheridan, LLP (57) ABSTRACT

The disclosed technology relates to a lighting system that utilizes an ambient light sensor to detect at least one of a color temperature and intensity of ambient light to set or adjust at least one of an intensity and color temperature of light to be emitted by a plurality of LEDs. The plurality of LEDs include RGB+WW LEDs.

20 Claims, 8 Drawing Sheets

(56) References Cited

OTHER PUBLICATIONS

Kevin Baxter and Ryan Avery, "SoftPanels—LED Lights with a Colour Meter built in", SoftPanels LED lights with Autocolor for Cine/Video/Photo Lighting. Made by eperts, with a LED Color Meter build into every light. Sep. 19, 2017. https://www.kickstarter.com/projects/softpanels/softpanels-led-lights-with-autocolor-for-cine-vide.

* cited by examiner

AMBIENT LIGHT SENSING LIGHTING STROBE SYSTEM

CROSS-REFERENCE TO RELATED APPLICATION

The present application is a Continuation-in-part of U.S. Non-provisional patent application Ser. No. 16/359,078, filed Mar. 20, 2019, entitled "AMBIENT LIGHT SENSING LIGHTING STROBE SYSTEM," which claims the priority benefit of U.S. Patent Application No. 62/646,375, filed Mar. 22, 2018, entitled "AMBIENT SENSING PHOTO STROBE SYSTEM AND METHOD," the disclosures of which are incorporated herein by reference in their entireties

TECHNICAL FIELD

The present disclosure relates generally to lighting systems, and more particularly, to an ambient light sensing lighting system.

BACKGROUND

Conventional image capture systems may utilize a light emitting diode ("LED") to illuminate a subject of a photograph. Such systems, however, typically provide inadequate light in low ambient light environments. Particularly, for small and portable devices, such as smartphone cameras, an LED flash is typically limited to a few watts making them inadequate in low ambient light environments. Conventional strobe or flash lighting systems also lack functionality for accurately matching the color of ambient light so that shadows are not of a different color than non-shadowed areas in the captured image and so that the subject will appear to have uniform tone.

SUMMARY

The disclosed embodiments provide for a lighting system that includes a plurality of LEDs and an ambient light sensor configured to detect an intensity and a color temperature of ambient light. The lighting system also includes a processor configured to receive an output from the ambient light sensor, the output representative of the intensity and color temperature of ambient light; and adjust, based on the output, an intensity and color temperature of the plurality of LEDs.

The disclosed embodiments provide for an electronic device that includes a camera, a plurality of LEDs, an ambient light sensor configured to detect an intensity and a color temperature of ambient light, and a processor that is configured to receive an output from the ambient light sensor, the output representative of the intensity and color temperature of ambient light; and adjust, based on the output, an intensity and color temperature of the plurality of LEDs.

In some embodiments, a method for controlling a lighting system is disclosed. The method includes detecting an intensity of ambient light using an ambient light sensor, detecting a color temperature of ambient light using the ambient light sensor, and setting an intensity of light to be emitted by a plurality of LEDs. The method further includes setting a color temperature and intensity of light to be emitted by the plurality of LEDs.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Conventional LED strobe or flash lighting systems may be inadequate for illuminating a subject in low ambient light environments. In addition, conventional LED strobe or flash lighting systems may be incapable of adjusting their color temperature based on the lighting conditions of an environment. Color temperature of sunlight varies wildly depending on the time of day, cloud cover, pollution, weather, season, location, and other environmental factors. Similarly, a color temperature of an indoor environment may also vary based on the type of lighting utilized in the room (e.g., incandescent, fluorescent, etc.), the amount of sunlight entering a space, and other factors that may alter lighting conditions in an indoor environment. Accordingly, there is a need for an LED strobe lighting system that is capable of sensing ambient lighting levels and color temperature to intelligently adjust a brightness and color temperature of a pulse of light generated by the strobe, in order to provide excellent lighting for capturing still images.

The disclosed technology addresses the foregoing limitations of conventional LED strobe and flash systems by utilizing an intelligent color tunable LED strobe system that is capable of sensing and measuring a lighting level or brightness, as well as color temperature, of ambient light in an environment to generate a pulse or flash of light to illuminate a subject with sufficient brightness and color to capture superior still-images.

Figure 1:
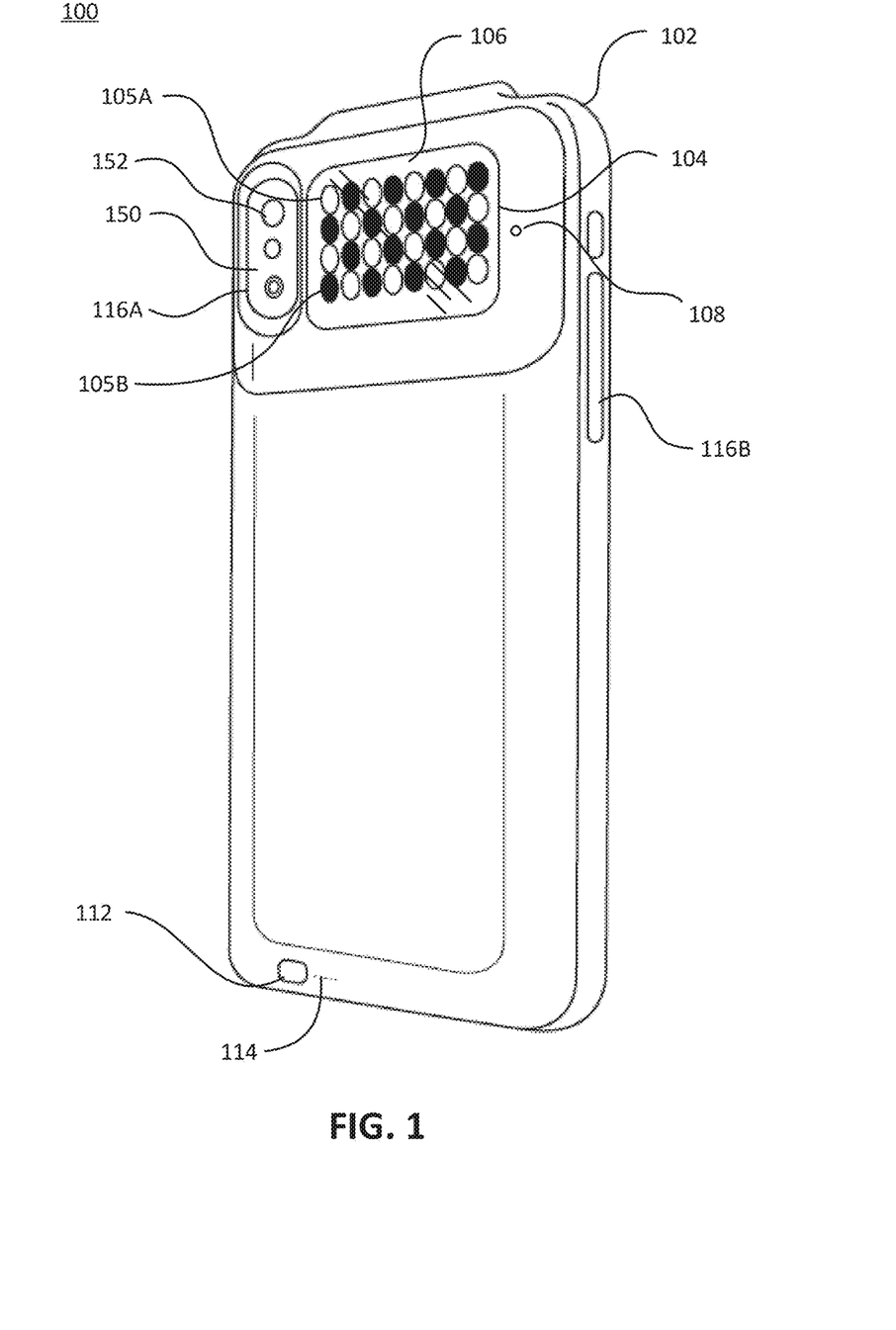
FIG. 1 illustrates a perspective view of a lighting strobe system incorporated within a portable device case, in accordance with various aspects of the subject technology.
Figure 6:
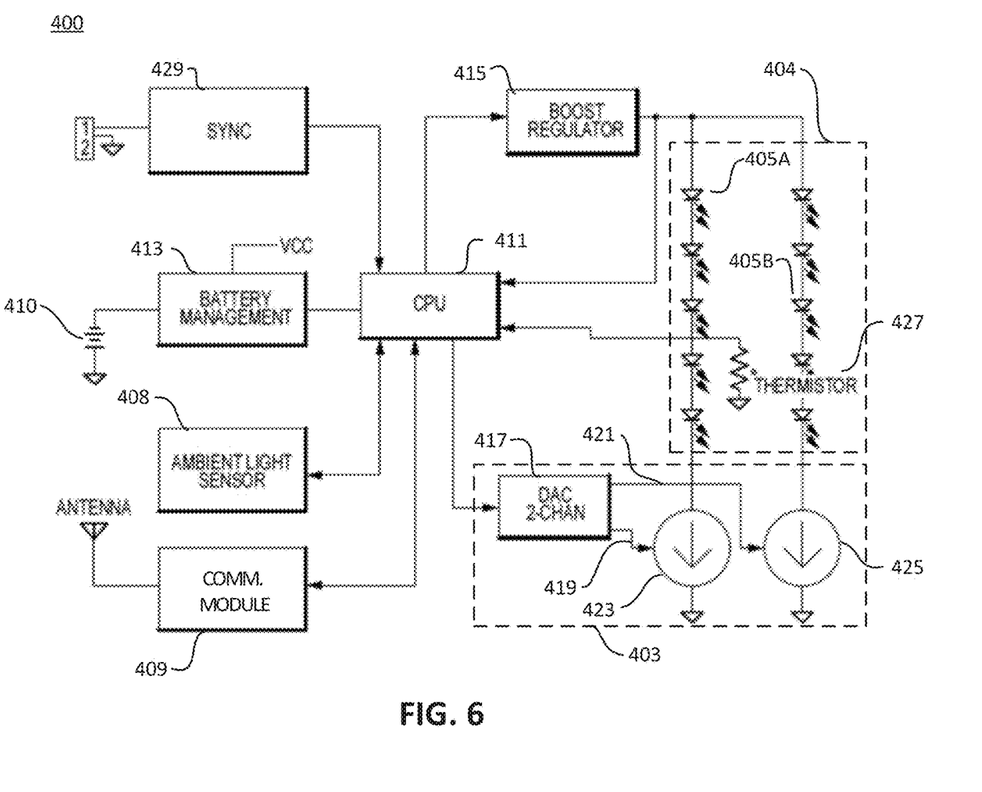
FIG. 6 illustrates a block diagram of a lighting strobe system, in accordance with various aspects of the subject technology.

FIG. 1 illustrates a perspective view of a lighting strobe system 100 incorporated within a portable device case 102, in accordance with various aspects of the subject technology. The lighting strobe system 100 is configured to provide sufficient and adequate lighting to illuminate a subject of a still-image or photograph. The lighting strobe system 100 may provide substantially all of the light used to expose the subject, provide only fill light to reduce the darkness of shadows from the ambient light, or be used to provide an artistic effect, as desired. The lighting strobe system 100 may comprise a plurality of LEDs 104, one or more lenses 106 for controlling the beam angle of the light emitted by the plurality of LEDs 104, an ambient light sensor 108, and a processor (as shown in FIG. 6). In one aspect, the lighting strobe system 100 may be configured to utilize one or more processors of the portable electronic device to perform one or more of the functions described further below.

In one example, the plurality of LEDs 104 may comprise RGB+WW LEDs (e.g., Red Green Blue Warm-White). Each LED of the plurality of LEDs 104 may comprise a warm-white diode and RGB color diodes. In another aspect, the plurality of LEDs 104 may be configured to output 20-50 Watts and over 3000 lumens using LEDs that emit two or more color temperatures to allow tuning of the color temperature of the light produced by the lighting strobe system 100. In some aspects, the plurality of LEDs 104 may have a color rendering index (CRI) greater than 90. The plurality of LEDs 104 may be surface mount type light emitting diodes.

In another example, the plurality of LEDs 104 may comprise a first array of LEDs 105A comprising warm color temperature LEDs having a color temperature approximating incandescent lighting (e.g., 2400-3600 Kelvin), and a second array of LEDs 105B comprising cool color temperature LEDs having a color temperature approximating daylight (e.g., 5600-7500 Kelvin). Each of the first array and the second array of LEDs, 105A and 105B respectively, may be separately driven or powered, as described below with reference to FIG. 6.

The lighting strobe system 100 may comprise, for example, twelve warm LEDs in the first array of LEDs 105A and twelve cool LEDs in the second array of LEDs 105B. The LEDs of the first array and the second array, 105A and 105B respectively, may be arranged in an alternating arrangement wherein a warm LED is disposed between two cool LEDs. Similarly, a cool LED may be disposed between two warm LEDs. Referring to FIG. 1, in another example, the lighting strobe system 100 may comprise sixteen warm LEDs in the first array of LEDs 105A and sixteen cool LEDs in the second array of LEDs 105B. The LEDs of the first array and the second array, 105A and 105B respectively, may be arranged in an alternating checkerboard arrangement wherein a first warm LED is followed by a first cool LED, which is then followed by a second warm LED, which is then followed by a second cool LED. It is understood that the number of warm and cool LEDs of the first array and the second array, 105A and 105B respectively, may be any number, as desired. It is also understood that the plurality of LEDs 104 may be arranged in varying arrangements, shapes, and arrays, without departing from the scope of the invention. In some aspects, arranging the warm and cool LEDs of the first array 105A and the second array 105B in a checkerboard-like pattern causes the emitted light to be mixed to thereby generate and emit light of a homogenous color temperature when an intermediate color temperature is selected.

The plurality of LEDs 104 may be mounted on a circuit board coated with a neutral color, such as white, silver, gray, or black, and of a material having some reflective properties so that light that is reflected back from the lens 106 will be reflected toward the lens 106. In one example, the lens 106 may comprise a single lens disposed in front of the LEDs 104 to control the beam angle of the light emitted by the plurality of LEDs 104. In another example, the lens 106 may comprise multiple lenses that capture and focus the light emitted by each LED or a grouping of LEDs.

The ambient light sensor 108 may be configured to measure a brightness of ambient light surrounding the lighting strobe system 100. In one aspect, the ambient light sensor 108 may be configured to detect a pulse of light from an external pulse of light, strobe or flash so that and when detected, the lighting strobe system 100 is configured to emit a pulse of light such that the lighting strobe system 100 operates in a "slave" mode. In another aspect, the ambient light sensor 108 may be configured to measure a color temperature of ambient light surrounding the lighting strobe system 100.

Figure 3:
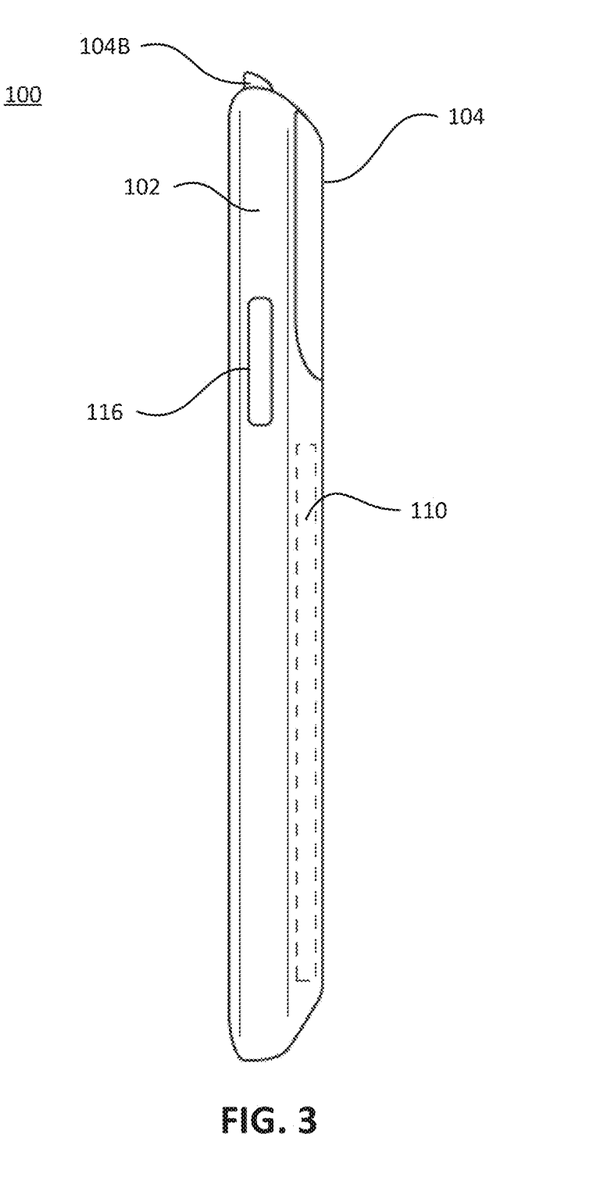
FIG. 3 illustrates a side view of a lighting strobe system incorporated within a portable device case, in accordance with various aspects of the subject technology.

In one aspect, the lighting strobe system 100 may be powered by an internal battery 110 (as shown in FIG. 3) disposed within the case that is configured to provide electrical power to the lighting strobe system 100. In another aspect, the internal battery 110 may also be configured to provide additional power to a portable electronic device 150 disposed within the case 102. In yet another aspect, the lighting strobe system 100 may be configured to be powered by the portable electronic device 150. The internal battery 110 may be a rechargeable battery or secondary cell, such as a lithium ion battery. In one aspect, the lighting strobe system 100 may comprise a charging port that is configured to charge the internal battery 110 and the portable electronic device 150, simultaneously. When a charge of the internal battery 110 is full, the lighting strobe system 100 may be configured to direct additional charge provided to the charging port to the portable electronic device 150 until a battery of the portable electronic device 150 is full.

Figure 2:
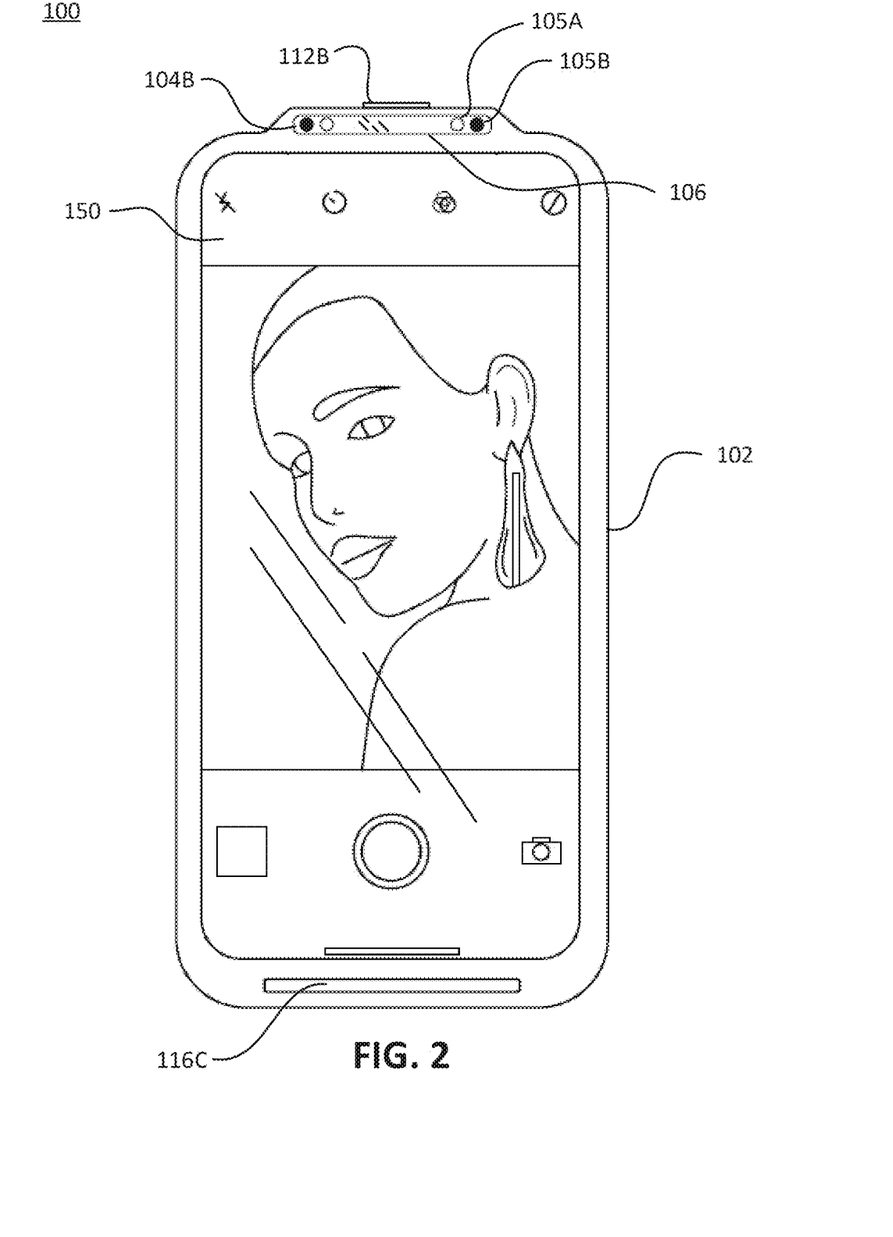
FIG. 2 illustrates a front view of a lighting strobe system incorporated within a portable device case, in accordance with various aspects of the subject technology.

The lighting strobe system 100 may be housed within the case 102 that is configured to receive the portable electronic device 150, such as a mobile phone, smartphone, or tablet. For example, the case 102 may substantially cover a rear surface of the portable electronic device 150 (as shown in FIG. 1) and surround a periphery of a front surface of the portable electronic device 150 (as shown in FIG. 2). The plurality of LEDs 104 may be disposed proximate to a camera lens or shutter 152. The case 102 may be a unitary case, comprised of a single component, or may be formed of a plurality of components that are configured to attach or couple together to surround the portable electronic device 150.

The case 102 may include one or more buttons 112 that are each configured to receive user input for operation of the lighting strobe system 100. For example, a power or multi-button 112 may be disposed on a lower portion of the case 102 that when depressed, may power on or power off the lighting strobe system 100. The multi-button 112 may also be configured to facilitate pairing with the portable electronic device 150 when depressed for a short period of time. The multi-button 112 may also be configured to cause the plurality of LEDs 104 to emit a high-brightness light (e.g., flashlight or continuous light) when depressed once, or a low-brightness light (e.g., flashlight or continuous light)

when depressed twice. In other aspects, the multi-button 112 may be configured to control operations of the lighting strobe system 100 based on a duration of a depression. For example, the multi-button 112 may be configured to cause the internal battery 110 of the case 102 to charge the portable electronic device 150 when depressed for a duration of two seconds. In another example, the multi-button 112 may be configured to power off the lighting strobe system 100 when depressed for a duration of four seconds.

In another aspect, the case may have a button disposed on an upper portion of the case 102 to control operation of the plurality of LEDs 104. For example, a button 112B (as shown in FIG. 2) may be disposed proximate to the plurality of LEDs 104 to control a brightness of light emitted by the plurality of LEDs 104. In this example, when depressed for an elongated period of time, the plurality of LEDs 104 may cycle from bright to dim, and vice versa.

In some aspects, the case 102 may also include one or more indicators 114 that are configured to indicate to a user a status of the lighting strobe system 100. For example, the case 102 may include a first indicator comprising a multi-color LED that may emit a red-colored light to indicate to the user that the lighting strobe system 100 is powered on. The first indicator may also be configured to emit a blue-colored light to inform the user that the lighting strobe system 100 is charging or ready for pairing with the portable electronic device 150. As another example, the case 102 may comprise four or more indicators that are configured to inform a user a level of charge remaining in the internal battery. In this example, if there are four LED indicators, each illuminated indicator represents a charging capacity of 25%. It is understood that other colors and operating conditions may be conveyed to the user by modifying the color and/or illumination duration and pattern (e.g., solid light, blinking, phased in, phased out, etc.) of the one or more indicators.

The case 102 may also include one or more apertures 116 to facilitate operation of the portable electronic device 150. For example, the case 102 may include a camera lens aperture 116A to allow a camera 152 of the portable electronic device 150 to operate without obstruction. The case 102 may also include apertures 116B to allow a user to activate one or more buttons of the portable electronic device. In another example, the case may include one or more speaker apertures 116C to allow sound to be conveyed to the user (as shown in FIG. 2) or one or more microphone apertures to allow sound to be captured from the user.

In one aspect, the lighting strobe system 100 may be synchronized to a shutter of a camera of the portable electronic device 150 via a wireless connection, such as an RF, WiFi, Bluetooth, or other wireless connection as would be known by a person of ordinary skill. In other aspects, the lighting strobe system 100 may be operated through use of an application and/or processor running on the portable electronic device 150. For example, the application may be used to control certain parameters of the lighting strobe system 100, such as synchronization characteristics (e.g., creation of groups to control and synch multiple lighting strobe systems 100 together to enable multiple lighting strobe systems 100 to emit a pulse of light simultaneously, synchronization of a pulse of light emitted by the lighting strobe system 100 based on a shutter of a camera, etc.), adjust settings of the lighting strobe system 100 (e.g., default settings, brightness, color temperature between warm and cool, strobe duration, plus or minus f-stop adjustment, timer to flash, ISO settings, shutter speed, etc.), control available presets of the lighting strobe system 100 that affect the color temperature and brightness of the light emitted by the plurality of LEDs 104 (e.g., candle, sunset, tropical, day, artic, etc.), select operational modes (e.g., selfie mode in which the lighting strobe system emits continuous light, flash mode in which the lighting strobe system emits a flash, photobooth mode in which the lighting strobe system emits more than one flash in a sequence to facilitate the capture of a series of still-images, etc.).

In another aspect, the lighting strobe system 100 may be configured to operate using voice commands. For example, the processor of the lighting strobe system 100 may be directly or indirectly connected to a processor and microphone of the portable electronic device 150 to enable voice commands to control the operation of the plurality of LEDs 104. The voice commands may control the intensity or brightness of the plurality of LEDs 104, the color temperature of the plurality of LEDs 104 and operational modes (e.g., flash, selfie, flashlight, etc.).

In another aspect, the lighting strobe system 100 may be configured to utilize an ambient light sensor of the portable electronic device 150 to detect a brightness or intensity of the ambient light and/or the color temperature of the ambient light. For example, the lighting strobe system 100 may utilize wireless connection (e.g., RF, WiFi, Bluetooth) to receive data from the ambient light sensor of the portable electronic device 150 representing ambient light brightness/intensity and/or color temperature.

FIGS. 2 and 3 illustrate a front and side view, respectively, of the lighting strobe system 100 incorporated within the portable device case 102, in accordance with various aspects of the subject technology. In one aspect, a portion of the plurality of LEDs 104 may be disposed on a rear facing surface of the case (as shown in FIG. 1) and a remaining portion of the plurality of LEDs 104B may be disposed on a front facing surface of the case 102 (as shown in FIG. 2). In one aspect, the remaining portion of the plurality of LEDs 104B on the front facing surface of the case may be disposed on an upper portion of the case 102 along a periphery of the case 102. In some aspects, the remaining portion of the plurality of LEDs 104B on the front facing surface of the case may comprise RGB+WW LEDs or a plurality of warm and cool LEDs. For example, the plurality of LEDs 104B may include two warm LEDs 105A and two cool LEDs 105B, arranged along a linear array and disposed at outer ends of the array. The two warm LEDs 105A and the two cool LEDs 105B may be arranged on the linear array in an alternating arrangement wherein at a left-most position, a first warm LED is disposed, followed by a first cool LED, followed by a second warm LED, with a second cool LED disposed at a right-most position. In other aspects, the remaining portion of the plurality of LEDs 104B on the front facing surface of the case may comprise three warm LEDs 105A and three cool LEDs 105B. It is understood that the number of warm and cool LEDs, 105A and 105B respectively, of the remaining portion of the plurality of LEDs 104B on the front facing surface of the case 102 may be any number, as desired. It is also understood that the LEDs of the remaining portion of the plurality of LEDs 104B on the front facing surface of the case 102 may be arranged in varying arrangements, shapes, and arrays, without departing from the scope of the invention.

The lighting strobe system 100 may be configured to continuously output light from the remaining portion of the plurality of LEDs 104B on the front facing surface of the case 102 to provide constant illumination on a subject during a video capture session. In another aspect, the lighting strobe system 100 may be configured to continuously output light from the portion of the plurality of LEDs 104 on the rear facing surface of the case 102 to provide constant illumination during a video capture session. In yet another aspect, the lighting strobe system 100 may be configured to output a pulse of light from the remaining portion of the plurality of LEDs 104B on the front facing surface of the case 102 to illuminate a subject for a still-image capture or photograph. In yet another aspect, the lighting strobe system 100 may be configured to output a pulse of light from the portion of the plurality of LEDs 104 on the rear facing surface of the case 102 to illuminate a subject for a still-image capture or photograph.

Figure 4:
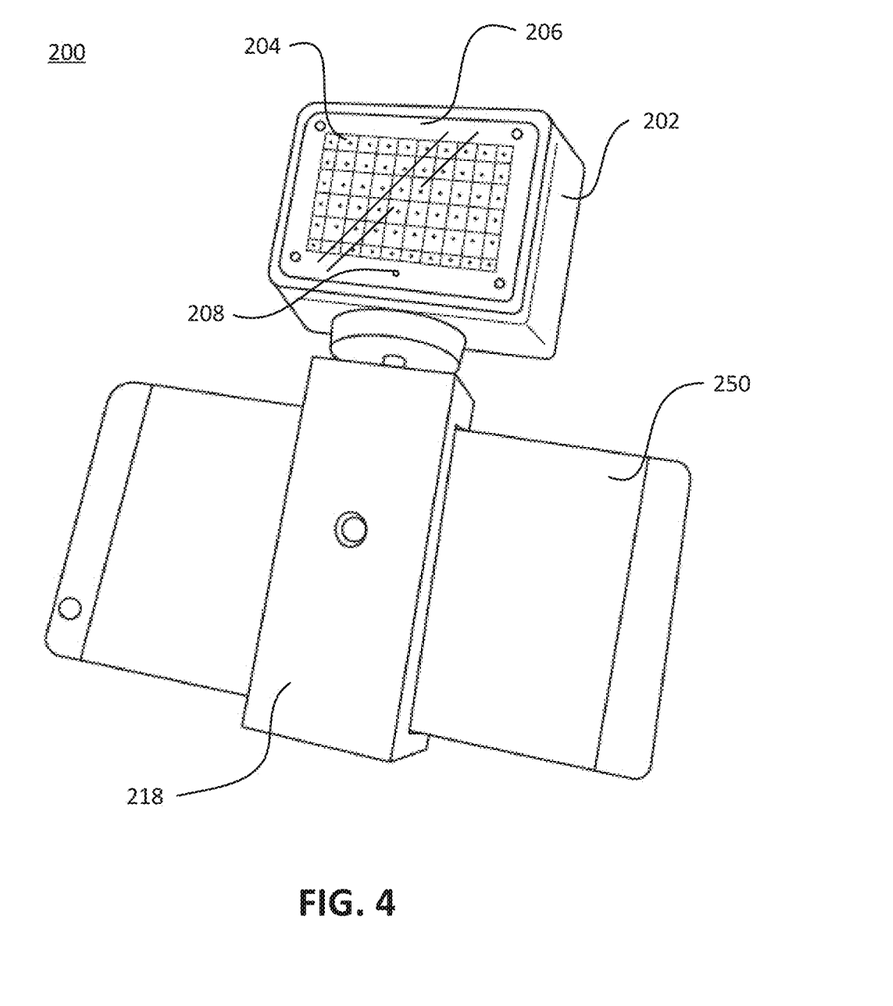
FIG. 4 illustrates a perspective view of a lighting strobe system removably attached to a portable device, in accordance with various aspects of the subject technology.

FIG. 4 illustrates a perspective view of a lighting strobe system 200 removably attached to a portable device 250, in accordance with various aspects of the subject technology. Similar reference numerals refer to similar or identical structure to the lighting strobe system 100. The lighting strobe system 200 comprises a housing 202, a plurality of LEDs 204 directed toward the front of housing 202, one or more lenses 206 for controlling the beam angle of the light emitted by the plurality of LEDs 204, and an ambient light sensor 208 to detect and measure characteristics of the ambient light, such as brightness or intensity and color temperature. In the example shown in FIG. 4, the lighting strobe system 200 may utilize about 60 LEDs that are configured to emit two or more color temperatures to allow tuning of the color temperature of the light produced by the lighting strobe system 200.

The housing 202 may comprise an attachment mechanism 218 for mounting to the portable electronic device 250, which may be a smartphone. For example, as shown in FIG. 4, the attachment mechanism 218 may be a spring-loaded clip that is configured to attach to a periphery of the portable electronic device 250. In another example, the attachment mechanism 218 may comprise a slip cover that is configured to slide over the portable electronic device. In yet another example, the attachment mechanism 218 may comprise a magnet that is configured to magnetically engage the portable electronic device 250. In yet another example, the attachment mechanism 218 may comprise an adhesive or hook and loop fabric that is configured to bond to the portable electronic device 250. Other attachment mechanisms 218 are contemplated without departing from the scope of the disclosure.

Figure 5:
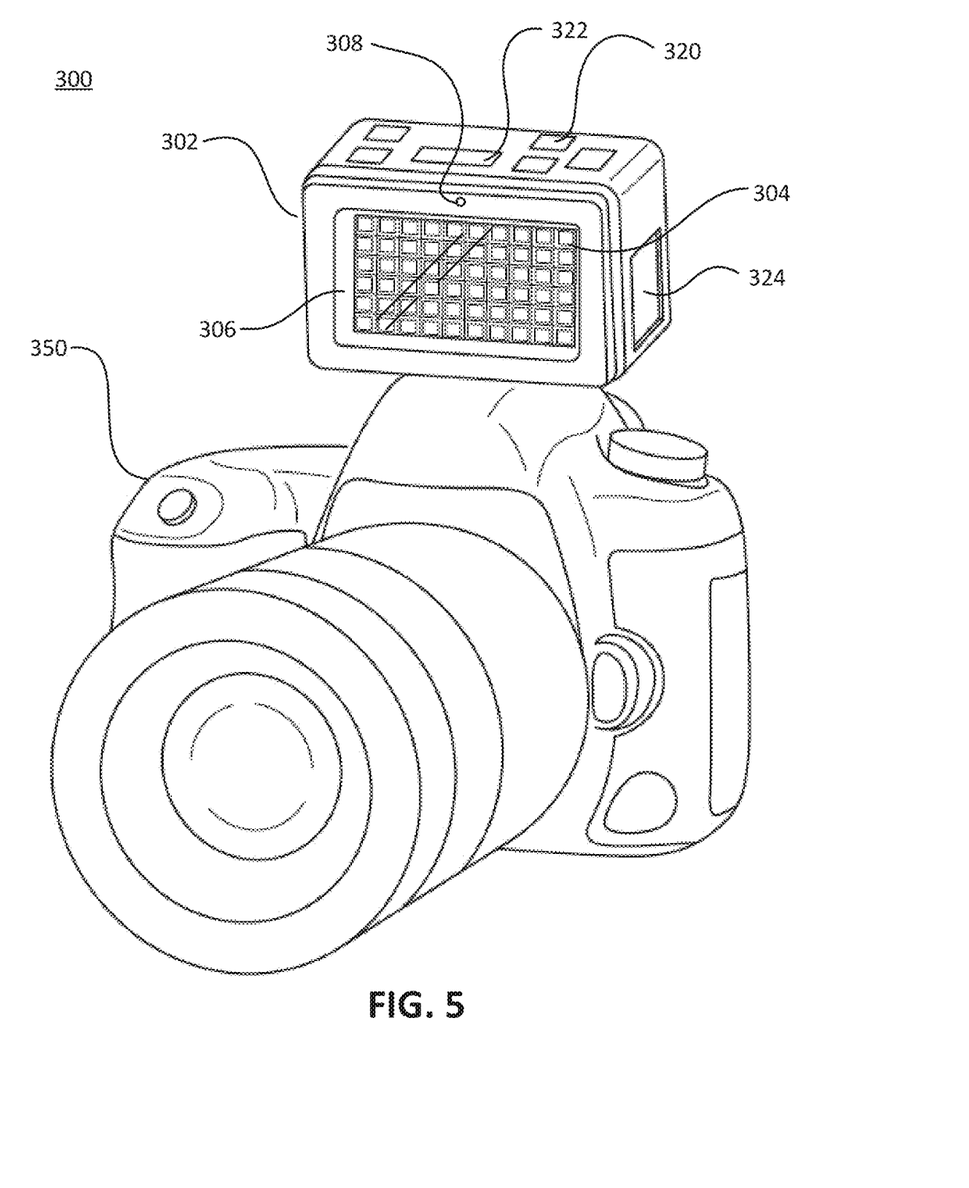
FIG. 5 illustrates a perspective view of a lighting strobe system incorporated on a camera, in accordance with various aspects of the subject technology.

FIG. 5 illustrates a perspective view of a lighting strobe system 300 incorporated on a camera 350, in accordance with various aspects of the subject technology. Similar reference numerals refer to similar or identical structure to the lighting strobe system 100. In one aspect, the lighting strobe system 300 may be configured to be mounted to or incorporated within a camera, such as a digital single lens reflex camera 350 ("DSLR"), a single lens reflex camera, a point-and-shoot style camera, or the like. The lighting strobe system 300 comprises a housing 302, a plurality of LEDs 304 directed toward the front of housing 302, one or more lenses 306 for controlling the beam angle of the light emitted by the plurality of LEDs 304, and an ambient light sensor 308 to detect and measure characteristics of the ambient light, such as brightness or intensity and color temperature. In another aspect, the lens 306 may be configured to receive a gel such as a colored filter or diffusion material. The lighting strobe system 300 may also comprise a shoe adapter for attachment to the camera 350. The shoe adaptor may comprise one or more electrical contacts to synchronize the lighting strobe system 300 to a shutter. In another aspect, the lighting strobe system 300 may be configured to use a sync cord for connection to the camera 350 to synchronize the lighting strobe system 300 with the shutter.

In some aspects, the housing 302 may comprise an attachment mechanism disposed on a lower portion of the housing 302, such as a threaded socket, for attachment to a ball head or shoe adapter, a tripod or lighting stand adapter, or to receive an accessory such as a multi-light bracket, external battery pack, or the like. In another aspect, the housing 302 may comprise a magnet disposed on a rear surface to facilitate attachment to metal surfaces as desired.

In some aspects, the lighting strobe system 300 may utilize a user interface 320 to receive user input to operate the lighting strobe system 300. For example, referring to FIG. 5, the user interface 320 may comprise a plurality of buttons that are configured to control operations of the lighting strobe system 300. The user interface 320 may be disposed on an upper portion of the housing 302 and may include a power button for turning the lighting strobe system 300 on and off; brightness controls for adjusting the intensity of the light, both in a continuous mode or during a flash; color temperature control for RGB+WW LEDs or for crossfading between the first and second arrays of LEDs, 150A and 150B, respectively, and an LCD or OLED display 322 for displaying the selected color temperature and/or a numerical indication of an intensity/brightness. The lighting strobe system 300 may also comprise a port 324 for charging an internal battery and/or programming certain features of the lighting strobe system 300.

It is understood that while the lighting strobe systems 100, 200 and 300 have been described above as a component of a case, stand-alone light, or integrated with an electronic device, the lighting strobe systems 100, 200 and 300 should not be limited to the above-described embodiments and numerous modifications fall within the spirit and scope of the subject technology.

FIG. 6 illustrates a block diagram of a lighting strobe system 400, in accordance with various aspects of the subject technology. Similar reference numerals refer to similar or identical structure to the lighting strobe system 100. The lighting strobe system 400 comprises a plurality of LEDs 404 (which may comprise an array of LEDs, such as a first array of LEDs 405A, a second array of LEDs 405B), an LED driver 403 for independently controlling the brightness of the first array and/or the second array of LEDs, 405A and 405B respectively, an ambient light sensor 408 for measuring one or more characteristics of the ambient light in the environment surrounding the lighting strobe system 400, a communications module 409 for communicating with or connecting to a camera or a portable electronic device, a battery 410 for powering the lighting strobe system 400, and a processor 411 for managing the function and operations of the lighting strobe system 400. The battery 410 may be managed by a battery management system 413 that is configured to provide regulated voltage to other electronic components of the lighting strobe system 400 and manage charging of the battery 410. It is understood that one or more functions of the processor 411 may be performed by one or more processors of a paired portable electronic device, such as a camera, smartphone, or tablet. It is also understood that one or more of the components of the lighting strobe system 400 may be shared with a paired portable electronic device.

In one example, the plurality of LEDs 404 may comprise RGB+WW LEDs. In another example, the plurality of LEDs 404 may comprise an array of LEDs, such as the first array of LEDs 405A and the second array of LEDs 405B. The first array of LEDs 405A may emit light at a relatively warm color temperature typically in a range from 2400 Kelvin to 4000 Kelvin. The second array of LEDs 405B may emit light at a relatively cool color temperature typically in a range from 4000 Kelvin to 8000 Kelvin.

The ambient light sensor 408 may be configured to measure an intensity (or brightness) and color temperature of the ambient light in the environment surrounding the lighting strobe system 400. In one example, the ambient light sensor 408 may be disposed proximate to the plurality of LEDs 404 to measure ambient lighting conditions from the perspective of the plurality of LEDs 404. In another example, the ambient light sensor 408 may be disposed within an image path within a housing so that the data from the ambient light sensor 408 is limited to either the captured frame or a portion of the captured frame, regardless of a selected lens.

In one aspect, the ambient light sensor 408 is configured to detect and measure three or more color bands of ambient light surrounding the lighting strobe system 400. The ambient light sensor 408 may be configured to detect and output data representing Red, Green, and Blue intensities of light. The detected values may be converted to CIE x-y values using a lookup table based on the ratio of Red over Blue, or other means of compensating for cross sensitivity of the individual color sensors. In one aspect, the lookup values may be adjusted to account for a degree to which Green varies from a reference value. The resulting data may then be converted to a color temperature using McCamy's polynomial formula for correlated color temperature (CCT): $CCT = 449*n^3 + 3525*n^2 + 6823.3*n + 5520.33$, where $n=(x-0.3320)/(0.1858-y)$. The processor 411 may be configured to receive and process data from the ambient light sensor 408 (e.g., Red, Green, and Blue intensities) and to process the data to determine CIE x-y values, color temperature, or any combination thereof. The ambient light sensor 408 may be configured to detect and output data representing an intensity of light, by for example, summing the Red, Green, and Blue registers. Intensity data may be supplied to the processor 411 as raw data, lux, foot candles, ev, or any combination of such values.

In some aspects, the ambient light sensor 408 may be used to calibrate the color temperature of light produced by the plurality of LEDs 404. For example, light emitted by the plurality of LEDs 404 may be directed to a white card, a diffuser, or other reflective surface to reflect a portion of the emitted light toward the ambient light sensor 408. In one example, the processor 411 may be configured to activate the plurality of LEDs 404 to output a known color temperature via the LED driver 403. In another example, the processor 411 may be configured to activate independently, the first array and the second array of LEDs, 405A and 405B respectively, via the LED driver 403. The ambient light sensor 408 may then be utilized to detect and measure a color temperature for the plurality of LEDs 404 or each of the first array and second array of LEDs, 405A and 405B respectively, and send data representing the detected color temperature to the processor 411 for comparison with stored values. In one example, the processor 411 may cause the LED driver 403 to power the plurality of LEDs 404 or to individually power the first array and the second array of LEDs, 405A and 405B respectively, through a series of preset ratios (e.g., brightness for each of the first and second array of LEDs ranging from 0-100% in 10% increments), while also receiving data from the ambient light sensor 408 regarding the detected intensity and/or color temperature at each preset. For example, for a preset of 1, each of the first array and the second array is at 100%. For a preset of ½, the first array is at 50% and the second array is at 100%. For a preset of 2, the first array is at 100% and the second array is at 50%. The detected color temperature for each of the first array and the second array of LEDs, 405A and 405B respectively, is stored in nonvolatile memory. To calibrate the color temperature produced by the first array and the second array of LEDs, 405A and 405B respectively, the processor 411 may be configured to read and compare the detected color temperatures for each of the first array and the second array of LEDs, 405A and 405B respectively, and compare the detected values to previously stored color temperature values associated for each preset ratio. If the processor 411 detects a difference between a detected value and a stored value, the processor 411 may be configured to adjust the LED driver 403 to account for the difference in value between the detected value and the stored value.

In one aspect, the processor 411 is configured to receive and use the measured intensity and color temperature of the ambient light from the ambient light sensor 408 to intelligently set a proportional brightness of the plurality of LEDs 404 or the first and second arrays of LEDs, 405A and 405B respectively, that is appropriate for the ambient conditions of the environment, as discussed further below.

The processor 411 may also be configured to communicate with a paired portable electronic device or camera via the communications module 409, via a wireless signal, such as through Bluetooth, Wifi, Zigbee, Z-Wave, and other suitable wireless schemes. In one aspect, the communications module 409 may include a Bluetooth interface for communication with the portable electronic device to allow a user to set a flash brightness, color temperature, duration, or other settings, and to override automatic settings when desired. In some aspects, the communications module 409 provides a bi-directional communication pathway between the lighting strobe system 400 and the portable electronic device that may enable an application, for example, running on the portable electronic device to interface with the lighting strobe system 400. For example, the communications module 409 may provide information about the environment and information about a camera of the portable electronic device (e.g., such as shutter speed, ISO, aperture and focal length, zoom, brightness, or other information that may be captured by the portable electronic device and that may be useful in optimizing exposure for a particular artistic effect) to the processor 411 for controlling a brightness or intensity, color temperature, or flash duration of light emitted by the plurality of LEDs 404. In one aspect, the information or data provided to the processor 411 from the communications module 409 and the portable electronic device may be compared to the information or data provided to the processor 411 by the ambient light sensor 408 to determine the appropriate brightness and/or color temperature settings for the plurality of LEDs 404. For example, for human subjects the processor 411 may be configured to adjust the color temperature of a pulse of light or flash emitted by the plurality of LEDs 404 to be warm so that skin tones appear warm and more pleasant to the user. In another example, if the environment is heavily backlit, the processor 411 may be configured to increase an output voltage of a boost regulator 415 to increase an intensity or brightness of the pulse of light or flash generated by the plurality of LEDs 404. In yet another example, the processor 411 may be configured to read the data received from the ambient light sensor 408 to adjust the intensity and/or color temperature of a pulse of light or flash generated by the plurality of LEDs 404 to recreate a "studio" look for portrait photographs. In other aspects, the processor 411 communicates with the battery management system 413 to minimize drain on the battery 410 depending on the needs of the lighting strobe system 400.

In one aspect, the lighting strobe system 400 may utilize a boost regulator 415 to increase a voltage to a level that is sufficient to drive or operate the plurality of LEDs 404 or the first array and the second array of LEDs, 405A and 405B respectively. In one aspect, the processor 411 is configured to calculate a current for each of the first array and second array of LEDs, 405A and 405B respectively, to determine a minimum amount of voltage required to ensure that the boost regulator 415 provides the proper voltage to the first array and second array of LEDs, 405A and 405B respectively.

The LED driver 403 may be configured to control an intensity or brightness of plurality of LEDs 404. For example, the LED driver 403 may be configured to control an intensity or brightness of each of the first array and the second array of LEDs, individually. The LED driver 403 may comprise a digital to analog converter 417 that has a pair of outputs 419 and 421, each individually controllable, connected to variable current sources 423 and 425, respectively, to set the drive current for each of the first array and the second array of LEDs, 405A and 405B respectively, thus making the brightness of each array independently controllable by the processor 411. The LED driver 403 is coupled to the first array of LEDs 405A to provide a selectable drive current to the first array of LEDs 405A. The LED driver 403 is also coupled to the second array of LEDs 405B to provide a selectable drive current to the second array of LEDs 405B.

In another aspect, the lighting strobe system 400 may utilize a thermistor 427 to provide LED temperature feedback to the processor 411. The thermistor 427 may provide data representing temperature of the plurality of LEDs 404 to the processor 411 to enable the processor 411 to intelligently set an output voltage of the boost regulator 415 to an optimal value. In another aspect, the temperature of the plurality of LEDs 404 may be used by the processor 411 to reduce voltage or power to the plurality of LEDs 404 when a temperature of the plurality of LEDs 404 reaches a predetermined maximum threshold.

The lighting strobe system 400 may further comprise a sync circuit 429 that is configured to receive a sync input from an external device, such as a camera, smartphone, or portable electronic device, to trigger a pulse of light to be emitted from the plurality of LEDs 404. The sync circuit 429, may for example, be connected to the processor 411 to trigger a flash of light from the plurality of LEDs 404 in response to the sync signal. The sync signal may be generated when a shutter of a camera is fully open, partially open, begins to open, or other timing sequences as would be known by a person of ordinary skill in the art. In one aspect, the processor 411 may be configured to accommodate a variety of sync inputs.

In operation, the communications module 409 may provide a communication pathway between the processor 411 of the lighting strobe system 400 and a portable electronic device having a camera. A user may control functions, settings or operations of the lighting strobe system 400 through an application running on the portable electronic device. The portable electronic device may comprise a user interface, such as a touchscreen and display, to solicit and receive input from the user. The user interface may allow the user to select a particular color temperature and/or brightness for a pulse of light or flash to be emitted by the plurality of LEDs 404. The settings and preferences may then be communicated or relayed to the processor 411 via the communications module 409. Based on detection of a sync input from the sync circuit 429, the processor 411 may cause the plurality of LEDs 404 to emit a pulse of light or flash at the selected color temperature and/or brightness.

By way of example and without limiting the scope of the subject technology, on powering up the lighting strobe system 400, the processor 411 of the lighting strobe system 400 may enter a sleep mode and wait for an event to awaken the processor 411. Such an event may be a periodic timer, a user input received from the user, a sync input, or voice command. Once awaken, the processor 411 may be configured to determine what caused the event and may, for example, read input buttons to see if one was pushed, and may check with the communications module 409 to see if a paired portable electronic device wishes to communicate.

The processor 411 may be configured to determine what operation mode has been selected by the user. For example, an operation mode may be selected by subsequent button pushes of the multi-button described above, via an application running on the paired portable electronic device, or a voice command. In one example, the operational modes may include a pulse/flash mode or a continuous light mode. Upon entering the flash mode the processor 411 periodically reads the ambient light sensor 408 to determine the color temperature of the ambient light in the environment. In response, the processor 411 may calculate a ratio between the first array and the second array of LEDs, 405A and 405B respectively, in order to achieve a color temperature for the flash that is substantially similar to the color temperature of the ambient light in the environment. In another example, the processor 411 may control the color temperature of RGB+WW LEDs, in order to achieve a color temperature for the flash that is substantially similar to the color temperature of the ambient light in the environment. The processor 411 may also be configured to read the ambient light sensor 408 to determine the intensity or brightness of the ambient light in the environment and in response, calculates an intensity for the flash and adjusts the output voltage of the boost regulator 415 to obtain a voltage that is required to achieve the desired flash. Upon receiving a command to generate the pulse of light or flash, the processor 411 causes the plurality of LEDs 404 to emit a pulse of light at the determined color temperature and intensity.

In one aspect, the processor 411 may be configured to receive additional data or information from a paired electronic device to adjust the color temperature and/or intensity of light generated by the plurality of LEDs 404. For example, the processor 411 may receive exposure information from the paired electronic device and may use the received exposure information to calculate a distance to a subject for use in determining an amount of intensity for a pulse of light to be generated by the plurality of LEDs 404. In another aspect, the processor 411 may also be configured to compare the amount of intensity calculated based on the exposure information with the amount of intensity calculated based on the level of intensity detected by the ambient light sensor 408 to determine if the subject is likely backlit, front lit, or top lit. In response, the processor 411 may be configured to calculate the amount of light or intensity needed to augment the ambient lighting conditions and as a result, adjusts the output voltage of the boost regulator 415 to obtain a voltage that is required to achieve the desired light for illuminating the subject. For example, if the processor 411 determines that the subject is backlit, the processor 411 may increase the output voltage. In another example, if the subject is front lit, the processor may reduce the output voltage.

In the continuous light mode, the processor 411 causes the plurality of LEDs 404 to emit a light for a continuous duration. The processor 411 may also be configured to periodically (e.g., every 1 second, every 5 seconds, every 10 seconds, etc.) read the ambient light sensor 408 to determine the color temperature of the ambient light in the environment and adjust the intensity and/or color temperature of light emitted by the plurality of LEDs 404 to maintain consistent illumination of a subject regardless of changing ambient light conditions. The processor 411 may calculate a ratio between the first array and the second array of LEDs, 405A and 405B respectively, in order to achieve a color temperature for the continuous light that is substantially similar to the color temperature of the ambient light in the environment, or otherwise desired. In another example, the processor 411 may control the color temperature of RGB+ WW LEDs in order to achieve a color temperature for the continuous light that is substantially similar to the color temperature of the ambient light in the environment, or otherwise desired. The processor 411 may also be configured to read the ambient light sensor 408 to determine the intensity or brightness of the ambient light in the environment and in response, calculates an intensity for the continuous light and adjusts the output voltage of the boost regulator 415 to obtain a voltage that is required to achieve the desired light for illuminating a subject or object.

In some aspects, the processor 411 may be configured to receive intensity and color temperature settings from the paired portable electronic device via the communications module 409. In another aspect, the processor 411 may be configured to select a default intensity and color temperature setting if there is no setting provided by the user or paired portable electronic device. The default color temperature may, for example, be set by sending an equal amount of current to each of the first array and second array of LEDs, 405A and 405B respectively. Sending equal amounts of current to each of the first array and second array of LEDs, 405A and 405B respectively, may conserve battery power.

In other aspects, the processor 411 may be configured to adjust an intensity and/or color temperature for the plurality of LEDs 404 based on user input. For example, a user may adjust the intensity and color temperature of the plurality of LEDs 404 by depressing one more input buttons, interfacing with an application running on a paired portable electronic device, or conveying voice commands. In one example, a user selectable intensity or brightness setting may be adjusted based on a number of times a button is pressed, or adjusted based on input from the user via a pair of up and down arrows. In response, the processor 411 modifies the ratio of voltage and/or current to be supplied to the plurality of LEDs 404 or first array and the second array of LEDs, 405A and 405B respectively, and causes the LED driver 403 to adjust the output of variable current sources 423 and 425.

Figure 7:
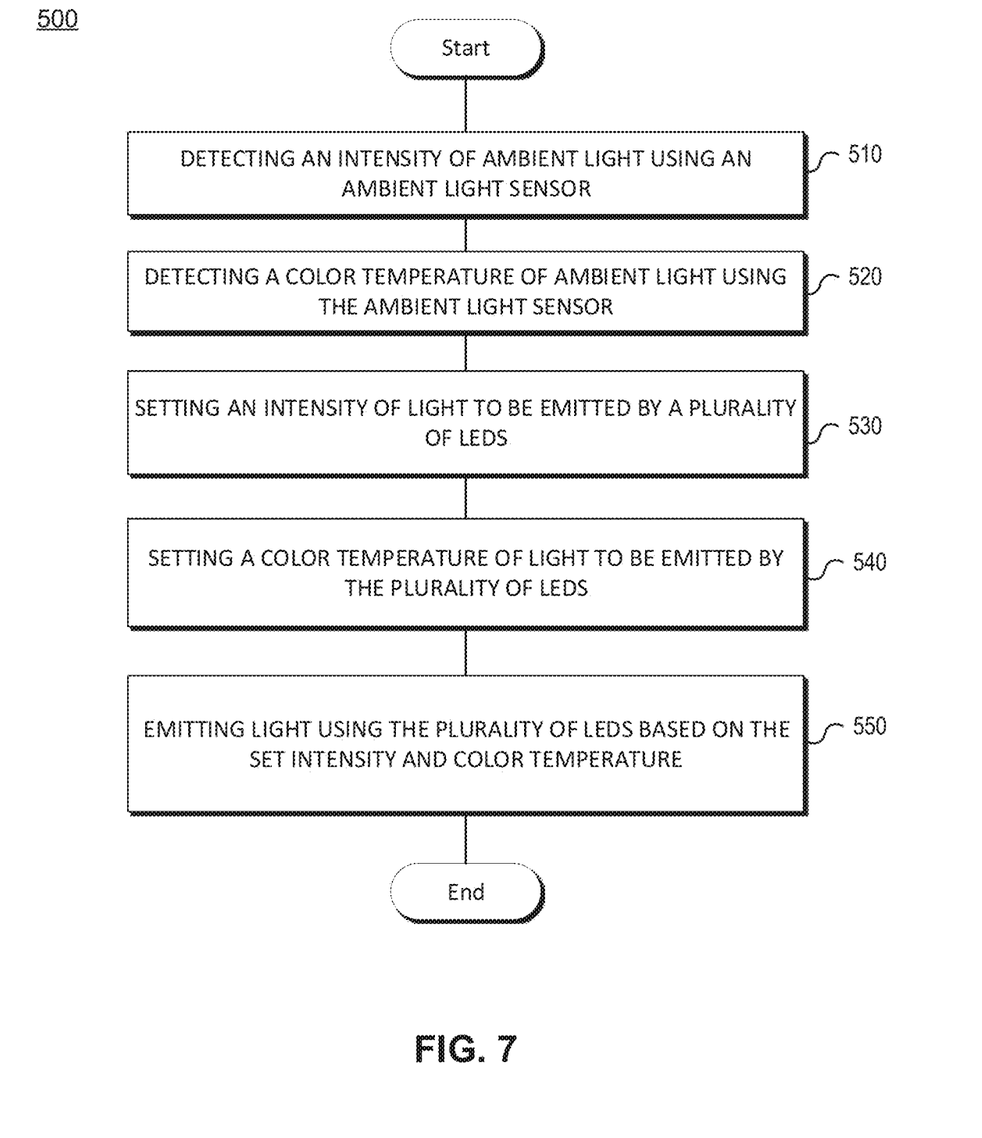
FIG. 7 illustrates an example method for controlling a lighting strobe system, in accordance with various aspects of the subject technology.

FIG. 7 illustrates an example method 500 for controlling a lighting strobe system, in accordance with various aspects of the subject technology. It should be understood that, for any process discussed herein, there can be additional, fewer, or alternative steps performed in similar or alternative orders, or in parallel, within the scope of the various aspects unless otherwise stated. The method 500 can be performed by a lighting strobe system (e.g., the system 100 of FIG. 1, the system 200 of FIG. 4, the system 300 of FIG. 5, the system 400 of FIG. 6,) or similar system.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 510 may include detecting an intensity of ambient light using an ambient light sensor. An operation 520 may include detecting a color temperature of ambient light using the ambient light sensor. An operation 530 may include setting an intensity of light to be emitted by a plurality of LEDs. In one example, the plurality of LEDs may comprise comprise RGB+WW LEDs. In another example, the plurality of LEDs may comprise a first array of LEDs and a second array of LEDs. The first array of LEDs may comprise warm color temperature LEDs having a color temperature of 2400-4000 Kelvin. The second array of LEDs may comprise cool color temperature LEDs having a color temperature of 4000-8000 Kelvin. An operation 540 may include setting a color temperature of light to be emitted by the plurality of LEDs. An operation 550 may include emitting light using the plurality of LEDs based on the set intensity and color temperature.

The method 500 may also include adjusting the color temperature of light to be emitted by the plurality of LEDs based on exposure data. The method 500 may also include adjusting the color temperature of light to be emitted by the plurality of LEDs based on a voice command, and adjusting the intensity of light to be emitted by the plurality of LEDs based on a voice command.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 8:
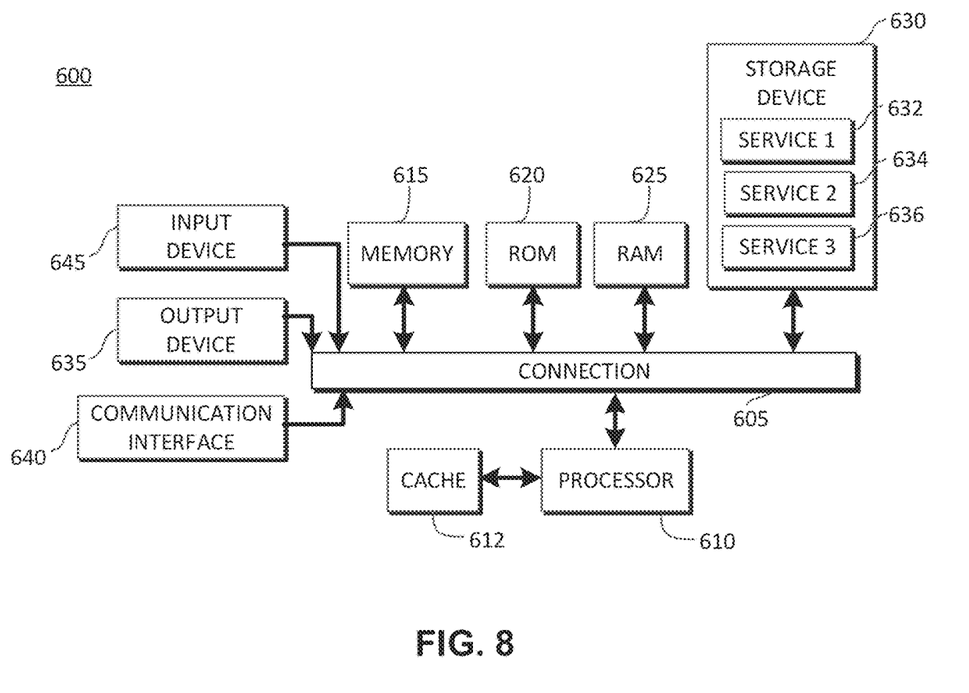
FIG. 8 illustrates an example of a system configured for adjusting a brightness and color temperature of light generated by a lighting strobe system, in accordance with some aspects.

FIG. 8 illustrates an example of a system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

System 600 includes at least one processing unit (CPU or processor) 610 and connection 605 that couples various system components including system memory 615, such as read only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

It will be appreciated that computing system 600 can have more than one processor 610, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, the term "module" may refer to any component or set of components that perform the functionality attributed to the module. This may include one or more physical processors during execution of processor readable instructions, the processor readable instructions, circuitry, hardware, storage media, or any other components.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A lighting system for use with a portable electronic device, comprising:
   a lighting assembly comprising a plurality of LEDs comprising RGB+WW LEDs, wherein the plurality of LEDs is configured to emit light in a first direction;
   an ambient light sensor configured to detect at least one of a color temperature and an intensity of ambient light;
   a processor configured to:
      receive an output from the ambient light sensor, the output representative of the at least one of the color temperature and intensity of ambient light; and
      adjust, based on the output of the ambient light sensor, an output of at least one of an intensity and a color temperature of the array of LEDs, wherein
         adjusting the output is performed by use of a communication link that is configured to allow communication between a portable electronic device and the lighting assembly, and the portable electronic device comprises a camera.

2. The lighting system of claim 1, further comprising an LED driver configured to supply current to the plurality of LEDs.

3. The lighting system of claim 2, wherein the processor is further configured to independently control, using the LED driver, an amount of current supplied to each LED of the plurality of LEDs.

4. The lighting system of claim 1, wherein the processor is further configured to:
detect an external pulse of light; and
in response to the detected external pulse of light, cause the plurality of LEDs to emit a pulse of light.

5. The lighting system of claim 1, wherein the processor is further configured to:
receive camera exposure data from the portable electronic device; and
adjust, based on the camera exposure data, at least one of the color temperature and the intensity of the array of LEDs.

6. The lighting system of claim 1, wherein the processor is further configured to:
receive user input from an application running on the portable electronic device; and
adjust, based on the user input, at least one of the color temperature and the intensity of the plurality of LEDs.

7. The lighting system of claim 1, wherein the processor is further configured to:
receive a voice command from a user; and
adjust, based on the voice command, at least one of the color temperature and the intensity of the plurality of LEDs.

8. The lighting system of claim 1, wherein the processor is further configured to independently control a color temperature and intensity of each LED of the plurality of LEDs.

9. The lighting system of claim 1, wherein the plurality of LEDs are disposed on a first surface of a housing, wherein the housing further comprises a second surface disposed opposite the first surface, wherein the second surface comprises an opening for receiving the portable electronic device.

10. The lighting system of claim 9, further comprising a second plurality of LEDs, wherein the second plurality of LEDs are disposed on the second surface of the housing.

11. The lighting system of claim 10, wherein the second plurality of LEDs are configured to emit light in a second direction that is opposite the first direction.

12. An electronic device, comprising:
a camera;
a plurality of LEDs comprising RGB+WW LEDs;
an ambient light sensor configured to detect at least one of a color temperature and intensity of ambient light;
a processor configured to:
receive an output from the ambient light sensor, the output representative of the at least one of the color temperature and intensity of ambient light; and
adjust, based on the output of the ambient light sensor, the output of at least one of an intensity and a color temperature of the plurality of LEDs.

13. The electronic device of claim 12, wherein the processor is further configured to independently control an amount of current supplied to each LED of the plurality of LEDs.

14. The electronic device of claim 12, wherein the processor is further configured to:
receive camera exposure data from the camera; and
adjust, based on the camera exposure data, at least one of the color temperature and the intensity of the array of LEDs.

15. The electronic device of claim 12, wherein the processor is further configured to:
receive user input from an application running on the electronic device; and
adjust, based on the user input, at least one of the color temperature and the intensity of the plurality of LEDs.

16. The electronic device of claim 12, wherein the processor is further configured to:
receive a voice command from a user; and
adjust, based on the voice command, at least one of the color temperature and the intensity of the plurality of LEDs.

17. A method for controlling a lighting strobe system for use with a portable electronic device, the method comprising:
detecting at least one of a color temperature and an intensity of ambient light using an ambient light sensor;
setting at least one of a color temperature and an intensity of light to be emitted by a plurality of LEDs comprising RGB+WW LEDs, wherein setting at least one of a color temperature and an intensity of light to be emitted by the plurality of LEDs is performed by use of a communication link that is configured to allow communication between the lighting strobe system and the portable electronic device, and the portable electronic device comprising a camera; and
emitting light using the plurality of LEDs based on the set color temperature or the intensity.

18. The method of claim 17, further comprising adjusting at least one of the color temperature and the intensity of light to be emitted by the plurality of LEDs based on camera exposure data.

19. The method of claim 17, further comprising adjusting at least one of the color temperature and the intensity of light to be emitted by the plurality of LEDs based on commands received from an application running on the electronic device.

20. The method of claim 17, further comprising adjusting at least one of the color temperature and the intensity of light to be emitted by the plurality of LEDs based on a voice command.

* * * * *